Nov. 9, 1937. F. L. JEFFERIES 2,098,293
DUSTLESS GRITS AND METHOD OF MAKING SAME
Filed July 18, 1934
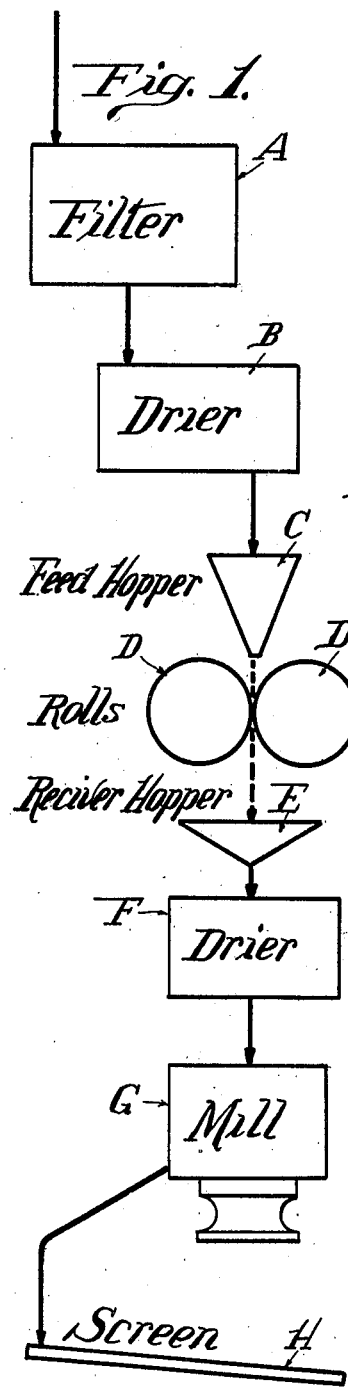
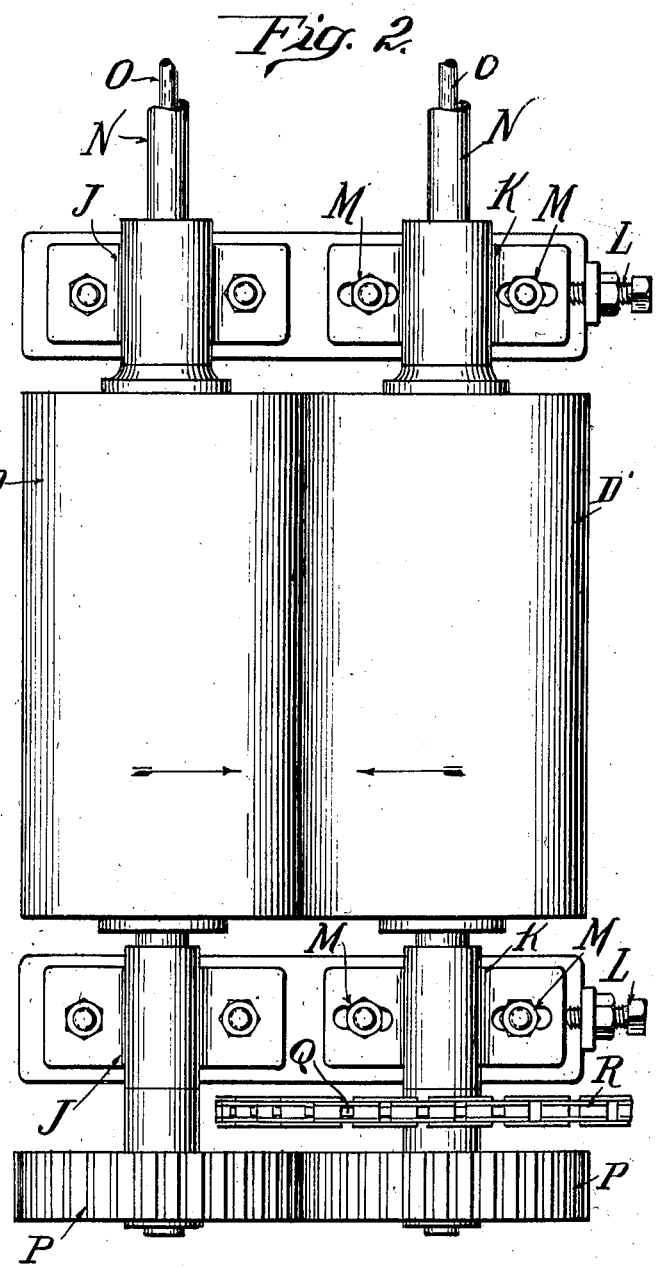
Inventor
Frederick L. Jefferies
Attorneys Patented Nov. 9, 1937

2,098,293

UNITED STATES PATENT OFFICE 2,098,293

DUSTLESS GRITS, AND METHOD OF MAKING SAME

Frederick L. Jefferies, La Grange, Ill., assignor to International Patents Development Company, Wilmington, Del., a corporation of Delaware Application July 18, 1934, Serial No. 735,742

4 Claims. (Cl. 127—32)

This invention relates to the manufacture of a corn starch product consisting of starch partially, but not completely, gelatinized, and aggregated in the form of flakes containing substantially no powder or dust.

The product may be used to advantage as a brewing adjunct, where the brewery is equipped with apparatus for pasting the starch. This product cannot be completely hydrolyzed by barley malt unless it be pre-pasted.

The product may also be used as a paper size, particularly for introduction into the process at the beater stage. The product may in fact be used for any purpose where it is desirable to have starch in the form of dustless flakes rather than the lumpy powder form, characteristic of ordinary commercial corn starch and where partial gelatinization is not objectionable.

The product differs from that disclosed in application of Fred O. Giesecke, Serial No. 552,079 filed July 20, 1931 (Patent 1,974,915, September 25, 1934), where the starch is completely gelatinized and, in fact, somewhat over-gelatinized so as to contain horny, insoluble or very difficultly soluble particles.

Apparatus suitable for making this product is shown in the accompanying drawing, wherein Fig. 1 is a diagram illustrating the successive steps of the process; and Fig. 2 is a plan view of the rolls for subjecting the raw starch to heat and pressure.

In carrying out the process, starch may be flushed from the starch tables (used in the manufacture of starch from corn, as now practiced, for separating the gluten from the starch) and the resultant starch milk filtered at A to reduce the water content to approximately 45% which is about as low a water content as can be had by filtering. The starch is then dried in drier B to a water content of from 20 to 30 per cent, and at this moisture content is fed continuously, and in small quantities, by means of the feeding hopper C, for example, between heated hollow rolls D, D' which are set close together and are revolved one toward the other. Obviously commercial dry starch could be used after moistening to the proper water content. The rolls are heated internally by steam at a pressure, preferably, of 105 pounds per square inch; although steam pressures above or below this may be employed by proper variation of the other control factors as will be hereinafter set forth. A steam pressure of 105 pounds is calculated to give a superficial roll temperature of about 290° F. This temperature differential as between the steam and exterior surface of the rolls is purely arbitrary and dependent upon the construction of the rolls which, in the contemplated instance, are 24 inches in diameter and of a thickness to give this particular superficial temperature with the steam pressure mentioned. The starch is fed to the rolls at the rate of approximately 1100 pounds per hour for rolls three feet in length. The rolls may be set either a small distance apart, or in contact one with the other, without pressure, or in contact with some developed pressure. The adjustment preferred for the moisture content temperature and time factor, the latter being measured by the rate at which the material is fed through the rolls, is such as to give a sheet thickness to the product, leaving the rolls of from 0.017 to 0.024 of an inch. Actually the rolls are in contact without substantial pressure.

The material from the rolls is collected in the hopper E, then passed to a drier F (if, as is likely, the material contains more moisture than is desired for commercial purposes), and from the drier F to a mill G where the more or less broken sheet of material is comminuted to flakes which, it may be said, can be reduced to a considerable degree of fineness without the production of any substantial quantity of fine powder or dust. The ground material is then screened to remove lumps by the screening device H.

It is to be understood that the drying, milling and screening steps are purely optional.

Referring to Fig. 2 the roll D is shown as mounted in fixed bearings J, while the roll D' is mounted in sliding bearings K, which latter are provided with adjusting screws L and set screws M. The rolls are provided with steam supply pipes N and outlet pipes O for water of condensation. The rolls have intermeshed gears P, and roll D' is provided with a sprocket Q driven by a link belt R.

No claim is made herein to the apparatus.

The above described treatment of the starch brings about a partial, but only partial, gelatinization of the starch with the production of a small amount, approximately 2.7%, of soluble substances, principally dextrine. The amount of dextrose (calculated as reducing sugar), is hardly more than a trace, being about 0.03%.

When subjected without prepasting to the Goob test for determining susceptibility of the material to hydrolysis through the action of barley malt, the material gives a blue reaction which indicates that there is a very substantial quantity of starch which has not been gelatinized and therefore is unconverted. In fact the raw starch particles are plainly discernible in the product by their white color. By describing these particles or granules as raw starch, it is intended to distinguish them from the gelatinized starch in which cellular structure is destroyed. The ungelatinized starch granules are cooked only enough to cause them to adhere to one another while still showing all of the characteristics of raw starch. Apparently the gelatinized starch is so dispersed with the cellular or raw starch that none of the product has the hard horny character of completely gelatinized starch.

The Goob test just referred to may be carried out as follows: 60 grams of barley malt, ground to a medium fineness, are mixed with 300 cubic centimeters of water, which has been brought to a temperature of 44° C. The mixture is stirred for 20 minutes and then heated to 70° C., gradually, within a further period of 15 minutes. With the malt mixture at 70° C. the starch is added to the amount of 40 grams, and the mixture is continuously stirred. If, after 30 minutes' time, the heating being continued to maintain 70° C., the product gives a blue reaction with iodine, the test shows that a very considerable portion of the starch was not gelatinized. That is, if the starch had been substantially gelatinized so that all of it could be hydrolyzed by the malt, the test would give a colorless reaction with ordinarily a slight brown tinge.

A product having the properties specified is obtained by proper adjustment of the controlling factors of moisture content, temperature, duration of treatment and pressure. The formula, with respect to these control factors, as given above, will produce the desired result and is regarded as the best and most reliable for the purpose; but there may be some variation in this formula provided the change in one control factor is accompanied by a corresponding adjustment in one or more of the other control factors.

Thus if the moisture content is substantially lower than that specified the temperature, or the duration of treatment, or the pressure must be increased; and if the moisture content is substantially above that specified, temperature, duration of treatment and pressure should be decreased in order to obtain the desired result.

The aggregation of the starch cells into flakes is produced, when the starch is moist, by the effect of heat and pressure. The gelatinization incident to this treatment, and necessary to some extent in order that the starch particles be aggregated and bound together in flake-like bodies, is increased by an increase of moisture content and is retarded by a lowering of moisture content. It takes place more rapidly at high temperatures and pressures. It continues, naturally, during the period of time in which the material is subjected to the heat and pressure, so long, that is, as there is sufficient moisture present, so that duration of treatment is also a factor. The moisture in the starch fed to the rolls is, of course, to a large extent evaporated by the heat of the rolls, and very quickly after the material comes into contact with the rolls. The quicker the evaporation takes place the shorter will be the period of effective treatment, so far as gelatinization is concerned, so that the original moisture content, the speed of the material through the rolls and the temperature of the rolls are all determinative of the effective duration of the treatment. If one factor is substantially varied, to obtain an equivalent product, it is necessary to readjust one or more other control factors. Lowering temperature can to some extent be compensated by increasing pressure or by increasing moisture content or by slowing up the speed through the rolls.

I claim:

1. A corn starch product, of the type produced by subjecting the starch to heat and pressure in the presence of water, consisting of raw starch, the granules of which are intact, with some gelatinized starch, aggregated in the form of dustless flakes, and containing substantially no non-starch substances nor horny, insoluble particles of gelatinized starch, whereby the flakes are capable of being pasted, with substantial completeness, for malting.

2. A corn starch product, of the type produced by subjecting the starch to heat and pressure in the presence of water, consisting of raw starch, the granules of which are intact, with some gelatinized starch, aggregated in the form of dustless flakes, containing not substantially more than 2.7% soluble substances, and containing substantially no non-starch substances nor horny, insoluble particles of gelatinized starch, whereby the flakes are capable of being pasted, with substantial completeness, for malting.

3. A corn starch product, of the type produced by subjecting the starch to heat and pressure in the presence of water, consisting of raw starch, the granules of which are intact, with some gelatinized starch in such proportion that the product gives a blue or raw starch reaction when subjected, without pre-pasting, to the Goob test, aggregated in the form of dustless flakes, and containing substantially no non-starch substances nor horny, insoluble particles of gelatinized starch, whereby the flakes are capable of being pasted, with substantial completeness, for malting.

4. A corn starch product, of the type produced by subjecting the starch to heat and pressure in the presence of water, consisting of raw starch, the granules of which are intact, with some gelatinized starch in such proportion that the product gives a blue or raw starch reaction when subjected, without pre-pasting, to the Goob test, aggregated in the form of dustless flakes, containing not substantially more than 2.7% soluble substances, and containing substantially no non-starch substances nor horny, insoluble particles of gelatinized starch, whereby the flakes are capable of being pasted, with substantial completeness, for malting.

FREDERICK L. JEFFERIES.